United States Patent [19]

Streit et al.

[11] Patent Number: 5,086,423
[45] Date of Patent: Feb. 4, 1992

[54] CROSSTALK CORRECTION SCHEME

[75] Inventors: Roy L. Streit, New London; Foster L. Striffler, East Lyme, both of Conn.

[73] Assignee: The United States of America as represented by the Secretary of the Navy, Washington, D.C.

[21] Appl. No.: 376,270

[22] Filed: Jul. 5, 1989

[51] Int. Cl.$^5$ ............................. H04J 1/12; H04J 3/10
[52] U.S. Cl. .......................................... 370/6; 379/417
[58] Field of Search ..................... 370/6; 379/417, 416, 379/415, 414

[56] References Cited
U.S. PATENT DOCUMENTS

| | | | |
|---|---|---|---|
| 3,660,608 | 5/1972 | Moose et al. | 370/6 |
| 4,113,987 | 9/1978 | Samuelsson | 370/6 |
| 4,407,020 | 9/1983 | Helliwell et al. | 370/6 |

FOREIGN PATENT DOCUMENTS 2123257 6/1982 United Kingdom .

Primary Examiner—Douglas W. Olms
Assistant Examiner—Wellington Chin
Attorney, Agent, or Firm—Michael J. McGowan; Prithvi C. Lall

[57] ABSTRACT

Crosstalk contamination of signals in a multichannel data transmission system is designated by a matrix which has unit values for the diagonal and small values for the off-diagonal terms. If this matrix satisfies the criteria for finding an inverse thereof, the matrix may be inverted and the results are used to find the values for the correction matrix electronic circuits. The correction electronic matrix circuits with their respective inputs from the telemetry receiver give their summed outputs for each channel to be the crosstalk contamination-free signals for various channels.

4 Claims, 2 Drawing Sheets

CROSSTALK CORRECTION SCHEME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

Subject invention is related to data transmission systems and more particularly to a scheme for correcting the crosstalk error between various groups or channels of a data transmission system.

(2) Description of the Prior Art

Whenever there is a transmission of data over multi-channels of a transmission system, there is always some crosstalk between channels which contaminates the signals and thus poses all kinds of problems. Currently, crosstalk contamination of signals in a multichannel data transmission system is reduced by using only passive methods such as better cables or wider frequency separations. There is thus a need for an active method for correcting contaminated signals resulting from cross talk between multichannels of a transmission system.

SUMMARY OF THE INVENTION

According to the teachings of subject invention, an active method of correcting contaminated signals in a multichannel data transmission system is described. Crosstalk, in multichannel data transmission systems, can be described by a matrix which has a unit value for the diagonal terms and small values for the off-diagonal terms. If this matrix satisfies the upperbound conditions, i.e., the crosstalk does not exceed a fixed value the matrix may be inverted and the elements of the inverse matrix are related to the values for the correction matrix electronic circuits. Various elements of the inverse matrix are thus transfer functions from which correction matrix electronic circuits can be synthesized using standard prior art techniques. Input of each of these circuits is the corresponding element in the crosstalk related to the corresponding pair of channels of the multichannel transmission system. Sum of the outputs of these circuits the input thereof as the contaminated signal for a particular channel will give us the corrected signal for that channel which will be free of crosstalk error. Thus, if there is a crosstalk contamination in a multichannel communication system and then if the crosstalk is stationary, measurable and meets the upperbound criteria, this scheme will appreciably reduce the crosstalk error in each channel. This technique uses the following steps:

First, measure both magnitude and phase of the cross talk between all possible channel-pairs of the multichannel transmission system over the frequency ranges of interest. Second, after arranging all of these complex values in a matrix form, invert the matrix. Third, using the various elements of the inverse matrix, synthesize crosstalk correction electronic circuits by using the appropriate frequency functions derived from the inverse matrix, and design each individual matrix correction electronic circuit so that the total corrections for each channel may be summed at the output. Fourth, pass all signals to be corrected through the hardware of various correction matrix circuits. The resulting signals are now duplicates of the original signals before being contaminated with the crosstalk errors.

An object of subject invention is to have a technique to correct for the contamination of the transmission signals contaminated by crosstalk between various channels of the N-channel data transmission system.

Another object of subject invention is to have a crosstalk contamination correction system using analog circuits.

Still another object of subject invention is to use digital circuitry to correct for the crosstalk contamination of the transmitted signals in a multi-channel transmission system.

Still another object of subject invention is to use an active method for removing contamination due to crosstalk between the channels of a multichannel transmission system.

Other objects advantages and novel features of the invention ma become apparent from the following detailed description of the invention when considered in conjunction with the accompanying drawings wherein:

DESCRIPTION OF A PREFERRED EMBODIMENT

Figure 1:
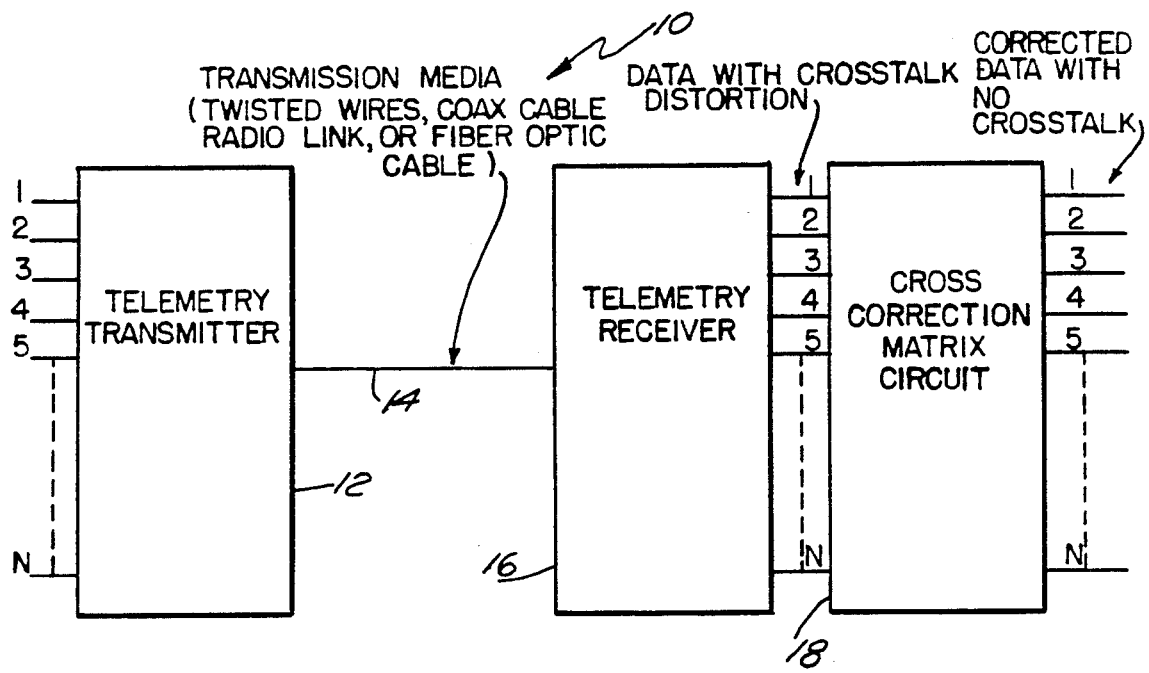
FIG. 1 is a block diagram of the overall transmission system incorporating the crosstalk correction matrix circuits represented by the crosstalk correction matrix.
Figure 2:
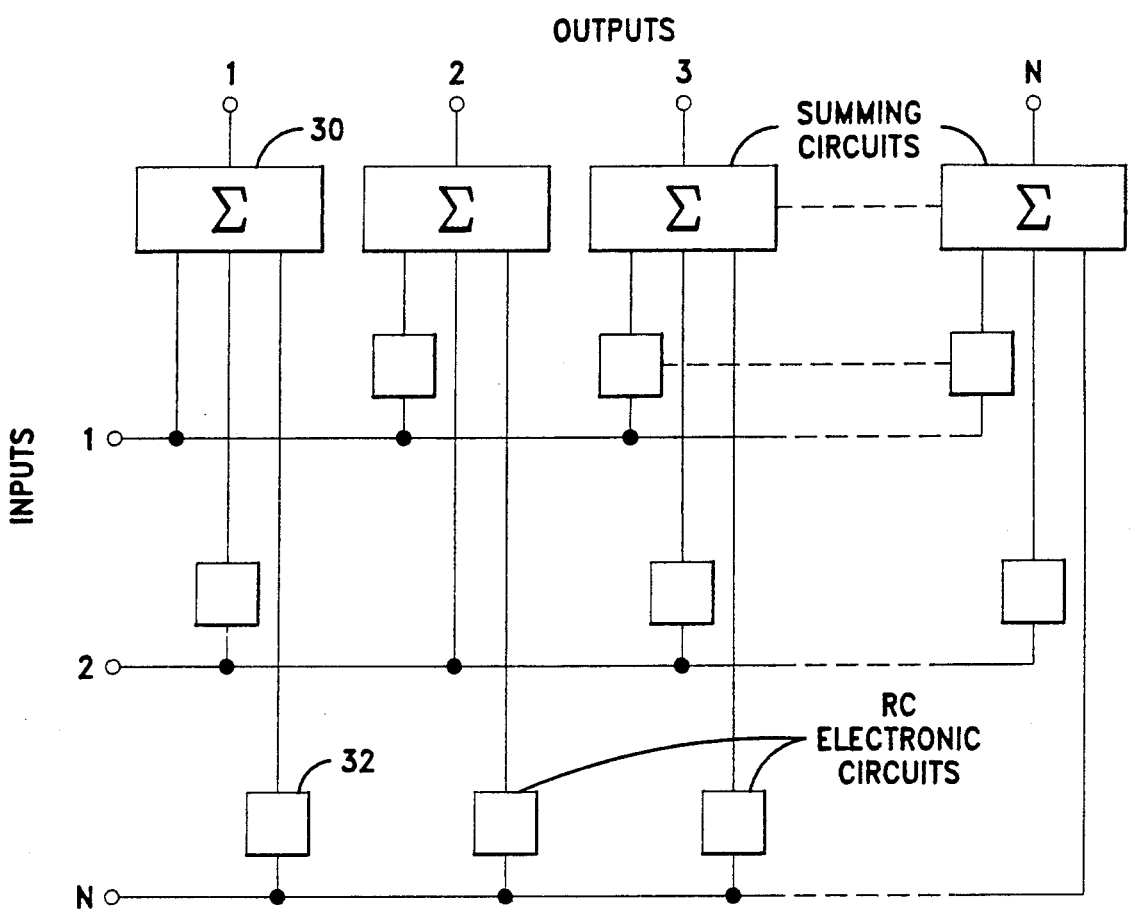
FIG. 2 is a schematic representation of the inputs and the outputs after passing through the correction matrix circuits and sum thereof for various channels of the transmission system.

Referring to the drawings wherein like reference characters designate identical or corresponding parts throughout the several figures and more particularly to FIG. 1, which schematically represents a transmission and receiving system 10 used for transmission of data from one location to another. It includes a telemetry transmitter 12 which receives and inputs data over different channels of the multichannel transmission system. The output of the transmitter 12 is transmitted using a transmission media 14 such as twist wires, coaxial cables, radio link or fiber optics cable and is received at the telemetry receiver 16. The signals received by telemetry receiver 16 are contaminated by the crosstalk between various channels over which the data is being transmitted. The output of the telemetry receiver 16 is then fed into the crosstalk correction matrix circuit bank 18. The output of the crosstalk correction matrix circuit bank 18 is then the corrected data for each channel which is now free of the contamination of the signals from crosstalk errors between various channels. FIG. 2 is a graphical representation of the various inputs from the telemetry receiver 16 and the crosstalk contamination correction data related to appropriate members of $N \times N$ correction matrix circuits and then summed to have as the output of the crosstalk correction matrix circuit bank 18 for each of the channels. As shown in FIG. 2 there are N inputs coming over N different channels from the telemetry receiver 16 to the cross correction matrix circuit bank 18 of N×N members. As an example, summer of correction terms for channel 1 is getting its inputs from channel 1 without any correction whereas from the remaining N−1 channels by means of RC circuits and all the correction terms are added together to give the output as uncontaminated output 1. Likewise, channel 2 receives the contribution for correction from all channels except channel 2 which is fed directly in to the summer for channel 2. The output of each of the N summers is then uncontaminated signal for respective channels of the N channels data transmission system.

Figure 3:
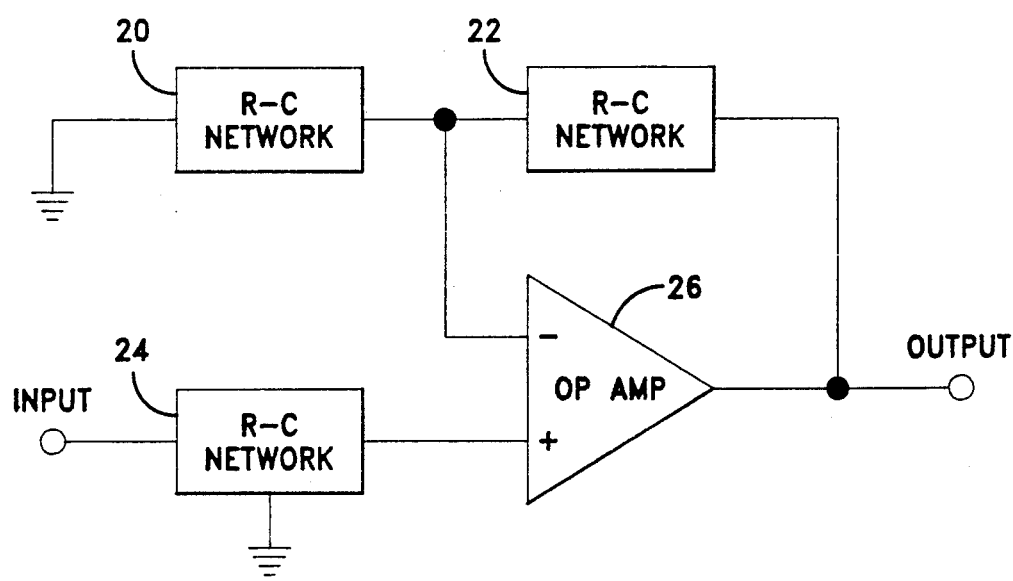
FIG. 3 is a block diagram of an RC circuit used to represent a typical element of the correction matrix circuits.

FIG. 3 is a schematic representation showing how three RC circuits 20, 22, 24 are connected together with operational amplifier 26 to provide the appropriate representation of one of the correction matrix elements in the N×N correction matrix. Each term in this correction matrix is a mathematical complex function of frequency. The correction matrix is then inverted and the elements of the inverse matrix are then used to synthesize corresponding electronic circuits using the well known art techniques as described in the prior art. As an example, the conversion of a complex function of frequency to synthesize an electronic circuit is a common practice as described in *Synthesis of Passive Networks* by E.A. Guillemin (John Wiley & Son, 1965) and *The Active Filter Handbook* by Frank P. Tedeschi (TAB Books, Inc. 1979) which are incorporated herein by reference. The concepts about inversion of the correction matrix and the related requirements are described in the prior art such as *Linear Systems* by Thomas Kailath (Prentice Hall, 1980) which is incorporated herein by reference.

Figure 4:
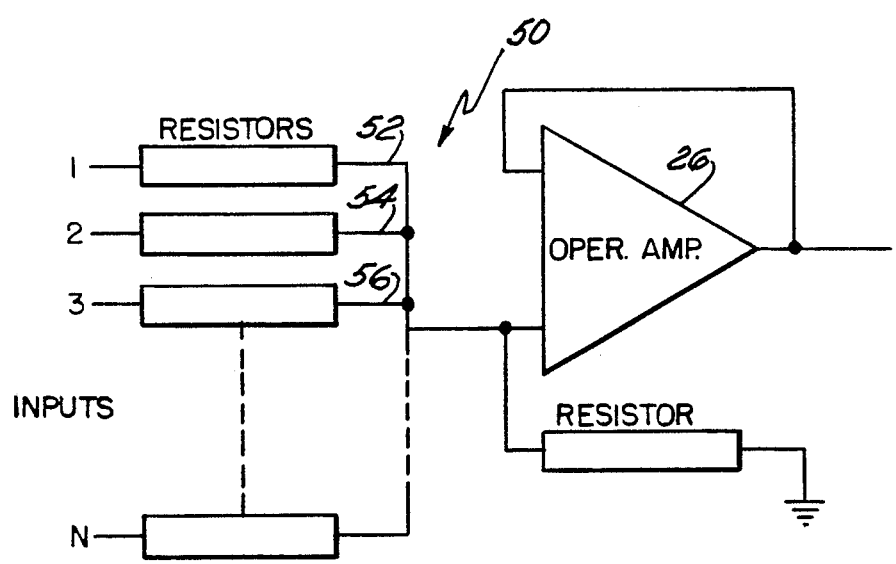
FIG. 4 is a block diagram of the summation of the crosstalk corrections by various contribution of the correction matrix circuits for a particular channel of the transmission system.

FIG. 4 is a representation of one of these summer circuits such as 50 where the contributions of N channels designated as 52, 54, and 56 etc. are provided to the summer corresponding to a particular channel. It should be understood that crosstalk in multiple channel transmission systems may be described by a matrix which has unit values for the diagonal terms and small values for the off-diagonal terms. The conditions necessary for this analysis are such that the crosstalk correction matrix satisfies the conditions of upperbound and that the matrix can be inverted and the result are the values for various elements of the inverse matrix which are related to corresponding correction matrix electronic circuits. Another requirement is that the crosstalk contamination in a multichannel communication system has to be stationary, is measurable, and meets the upperbound criteria in order for the teaching of this invention to be useful for removing the contamination by the crosstalk of the various channels.

Briefly stated, the method of correcting for the crosstalk contamination of the transmitted data involves the following steps:

(1) Measure both magnitude and phase of the crosstalk between all possible channel pairs of the multichannel communication system over the frequency range of interest.

(2) After arranging all of those complex values in a matrix form, invert the matrix.

(3) Using the appropriate frequency functions derived from the inverted matrix, design each individual correction matrix electronic circuit corresponding to each element of the inverse matrix so that the total correction for each channel may be summed at the output by passing all signals to be corrected through the hardware of representing correction matrix electronic circuits. The resulting signals are now duplicates of the original signals before being contaminated with the crosstalk signals.

Many modifications and variation of the present invention are possible in light of the above teachings. As an example, the correction matrix circuits can be either in analog form or in digital form. Furthermore, there can be variation in the choice of various correction matrix electronic circuits. It is therefore to be understood that within the scope of the appended claims the invention may be practiced otherwise than as specifically described.

What is claimed is:

1. A method for reducing crosstalk contamination of signals in a multi-channel data transmission system using N×N-electronic circuits and N-summers with N-electronic circuits corresponding to each of said N-channels and one each of said N-summers corresponding to each of said N-channels wherein said method comprises the steps of:

measuring crosstalk error between each possible pair of said N-channel data transmission system taking crosstalk contamination of each one of said N-channels with itself to be unity;

formulating an N×N crosstalk correction matrix having diagonal terms thereof to be unity and the off-diagonal terms representing the crosstalk contamination in a particular channel with the remaining channels of said N-channels;

computing an N×N inverse matrix of said crosstalk correction matrix with the diagonal terms thereof to be unity and the off-diagonal terms to be functions of frequency;

synthesizing N×N electronic circuits, each member thereof corresponding to a corresponding element of said inverse matrix, each of said N×N electronic circuits corresponding to a respective element of said N×N inverse matrix;

summing the outputs of said synthesized electronic circuits for every channel of said N channels with the input of the members of said N×N electronic circuits for said selected channel so as to cancel the crosstalk contribution from each of said channels; and obtaining crosstalk free output for every channel of said N-channel data transmission system.

2. The method of claim 1 wherein the step of synthesizing said N×N electronic circuits further includes the step of finding corresponding N×N analog electronic circuits.

3. The method of claim 1 wherein the step of synthesizing said N×N electronic circuits further includes the step of finding corresponding N×N digital electronic circuits.

4. The method of claim 1 which further includes adjusting electrical components of said N×N synthesized circuits so as to cover all frequency ranges of interest for the transmitted data signals.

* * * * *